(12) United States Patent  (10) Patent No.: US 9,038,157 B1
Santiago, Jr. et al.  (45) Date of Patent: May 19, 2015

(54) METHOD AND APPARATUS FOR INTEGRATING A DYNAMIC TOKEN GENERATOR INTO A MOBILE DEVICE

(71) Applicant: Bank of America Corporation, Charlotte, NC (US)

(72) Inventors: Milton Santiago, Jr., Chicago, IL (US); Mary R. Rosendahl, Wilmette, IL (US); Darin G. Mallory, Plainfield, IL (US); Michael C. Arredia, Chicago, IL (US); Jonathan F. McAteer, Flower Mound, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/176,100

(22) Filed: Feb. 9, 2014

(51) Int. Cl.
  *G06F 21/34* (2013.01)
  *H04L 29/06* (2006.01)
  *G06F 21/36* (2013.01)

(52) U.S. Cl.
  CPC ............ *H04L 63/0838* (2013.01); *H04L 63/12* (2013.01); *G06F 21/36* (2013.01); *G06F 21/34* (2013.01); *H04L 63/0846* (2013.01)

(58) Field of Classification Search
  None
  See application file for complete search history.

(56) References Cited

U.S. PATENT DOCUMENTS

| | | | |
|---|---|---|---|
| 6,880,079 B2 | 4/2005 | Kefford et al. | |
| 7,743,409 B2 | 6/2010 | Gonzalez et al. | |
| 7,904,946 B1 | 3/2011 | Chu et al. | |
| 8,213,906 B2 | 7/2012 | Chen | |
| 8,355,987 B2 | 1/2013 | Hirson et al. | |
| 8,412,646 B2 | 4/2013 | Tanner, Jr. et al. | |
| 8,484,710 B2 | 7/2013 | Vernon et al. | |
| 2010/0080383 A1* | 4/2010 | Vaughan et al. | 380/44 |
| 2011/0210171 A1* | 9/2011 | Brown et al. | 235/382 |
| 2012/0240204 A1 | 9/2012 | Bhatnagar et al. | |
| 2013/0035072 A1 | 2/2013 | Fisher | |
| 2013/0124292 A1* | 5/2013 | Juthani | 705/14.26 |
| 2013/0185209 A1 | 7/2013 | Ahn | |
| 2014/0298029 A1* | 10/2014 | Lu et al. | 713/172 |

OTHER PUBLICATIONS

"DIGIPASS for Mobile Integration Guide," Aug. 8, 2012, Version 1.0, VASCO Data Security, Inc., Chicago, Illinois.

* cited by examiner

*Primary Examiner* — David Pearson
(74) *Attorney, Agent, or Firm* — Weiss & Arons LLP; Michael A. Spring, Esq.

(57) ABSTRACT

A method for integrating a dynamic token generator into a mobile device is provided. The method may include displaying a display. The method may also include transmitting a serial number to a provider. The method may also include receiving a quick response ("QR") code from the provider. The QR code may contain token activation information. The token activation information may relate to the validated token serial number. The token activation information may include the serial number, an activation code, and an activation password. A dynamic token generator may be configured to internally recognize and scan in the quick response code displayed in the display. The dynamic token generator may also be configured to activate an OTP seed application using at least some of the information stored in the quick response code.

6 Claims, 11 Drawing Sheets

FIG. 4

METHOD AND APPARATUS FOR INTEGRATING A DYNAMIC TOKEN GENERATOR INTO A MOBILE DEVICE

FIELD OF TECHNOLOGY

This invention relates to integration of dynamic tokens into mobile devices.

BACKGROUND OF THE DISCLOSURE

To enhance the security of web-based pages, a variety of measures are often implemented. In some systems, upon attempting to access a secure website, a user may be prompted for a login which may include a username and/or a password.

Many webpages allow for a user to maintain a static password over time. Such static passwords, i.e., that remains the same over time, which may include a combination of ASKII characters, can be easy to hack if the password remains the same over time.

Alternatively, many website administrators have attempted to increase the security of their webpages by offering onetime passwords ("OTP"). For the purposes of this application, an OTP is a password that is only valid for one authentication process. OTPs can be used only once, and each authentication process requires a new OTP.

An OTP may allow for increased security by requiring a different password for each login attempt. An OTP is a constantly, or periodically, changing password. Because the password changes often, the user may be unaware of the password at any given moment. Such systems require the user to carry around a key fob, or other similar device, that displays the changing password.

Such a key fob typically includes a radio frequency receiver for receiving information for the current password.

To determine the password at a given point in time, the user is required to look at the key fob display for the current password.

At times, a user may require webpage access, and he may need his password to access the website. However, the user may be blocked from accessing the webpage because he does not possess the physical key fob at a certain time. Unfortunately, lack of possession of the key fob may waste time, cause missed appointments, and add frustration.

Additional disadvantages of the key fob can be illustrated, for example, upon the malfunctioning or loss of the key fob. Given the requirement of the physical key fob, a user would be unable to access an account until a replacement is received.

SUMMARY OF THE INVENTION

An apparatus for integrating a dynamic token generator into a mobile device, substantially as shown in and/or described in connection with at least one of the figures, as set forth more completely in the claims is provided. The apparatus may generate an OTP. Then, the application may enter the OTP into a website field. In doing so, the apparatus may relieve a user from having to type an OTP into an application. The apparatus may also maintain the security aspects of an OTP but relieve a user from typing token activation information i.e., information that is needed to register an OTP seed application into the application by using a self-reading quick response ("QR") code. An OTP seed application may be an application which generates one-time passwords.

Some embodiments integrate an OTP seed application into a mobile device. Other embodiments integrate the token generator into other electronic devices, including but not limited to; personal computers, servers, mainframes, personal digital assistants ("PDA"s), etc.

Certain embodiments incorporate an OTP seed application by downloading the application onto a mobile device. Other embodiments incorporate an OTP seed application by having the program preinstalled on the device. The application may generate OTP(s) based on a point in time, or other suitable information and the OTP seed resident in the OTP seed application.

In order to register the OTP seed application on a mobile device, activation information may be needed. The activation information may be received from a provider. The provider may manipulate the information received from the user using complex algorithms. The information the provider transmits to the user may be manipulations of numbers using different complex algorithms. The activation information may include the serial number, the authorization code, and the activation password. In conventional processes, activation information was typically typed, by a user, into the provider's screen.

At times, the user would mistype the activation information, not type the information sufficiently quickly, or the user would resist typing in the burdensome information.

Certain embodiments utilize a self-reading QR code. The activation information is transmitted to the user in the form of a self-reading QR code. This QR code may be internally recognized and scanned on the mobile device. This relieves the user of having to type the activation information into the device.

The mobile device may transmit the activation information to the provider. The OTP seed application may then become activated.

Such an OTP seed application preferably minimizes user interaction associated with the establishment of the application.

Instead of a user being prompted for an OTP and typing in the OTP, the provider, who is requesting the OTP, may prompt the OTP seed application for an OTP. In response, the OTP seed application may provide the provider with the correct OTP.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows an illustrative apparatus in accordance with principles of the invention;

DETAILED DESCRIPTION OF THE DISCLOSURE

Figure 1:
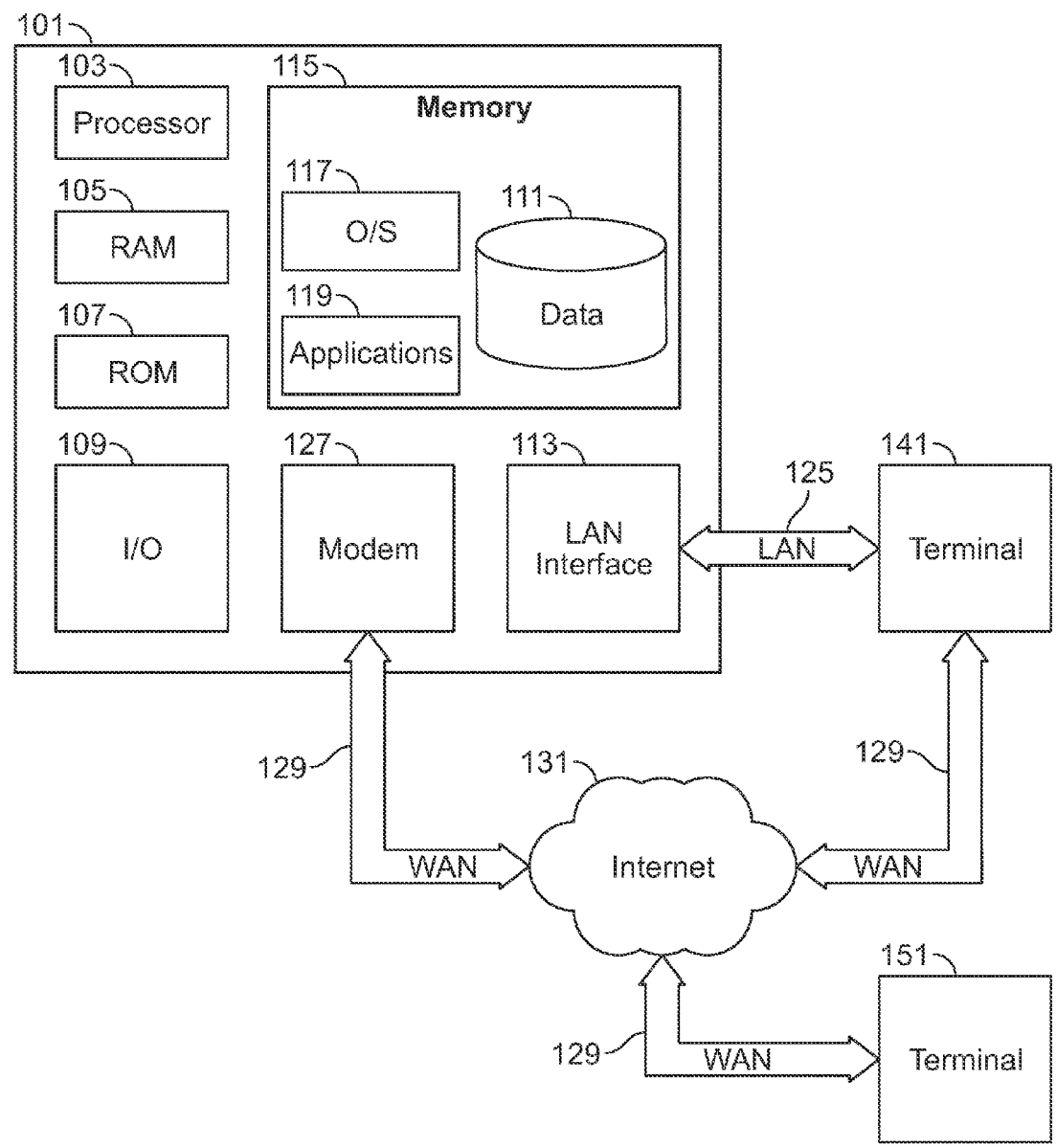
FIG. 1 shows an illustrative apparatus in accordance with principles of the invention.

Apparatus and methods for minimizing user interaction with an OTP in a mobile device is provided. Such apparatus and methods may include mobile device hardware and software that support the receiving of an OTP seed application. The OTP seed application may be used to generate OTPs.

The apparatus may include a display. The apparatus may also include a transmitter configured to transmit a serial number to a provider, which may have been received from an entity website administrator. The apparatus may also include a receiver configured to receive a QR code generated by the provider in response to receiving and validating the serial number. The QR code may contain token activation information relating to the validated token serial number. The token activation information may include a serial number, an activation code, and an activation password.

The apparatus may also include a processor which is configured to display the QR code, internally recognize and scan the QR code displayed on the display, and in response to scanning the QR code, read the information encoded in the QR code. The processor may be further configured to, in response to reading the information encoded in the QR code, activate the OTP seed application using at least some of the information stored in the QR code. Thus, scanning the QR code registers the OTP seed application.

It should be noted that the QR code may be displayed on screen to the user as part of an authenticated web session. In certain embodiments, the QR code and associated token activation data may be specific to the user thereby preferably allowing only a token provisioned for that user to be activated via the generated QR code. Thus, the QR code may form part of a user's web session so that the user has been (1) authenticated (2) receiving the QR code on his or her computer as part of his or her web session—e.g., an online banking session—(3) can preferably only activate a token he or she has access and/or permission to activate. While the term user is used herein, in certain embodiments, the user can actually activate one of a pre-determined number of tokens provisioned to his or her respective entity.

The processor may be further configured to generate a post-activation request in response to activation of the OTP seed application. In certain embodiments, the post-activation may be optional and not required. The post-activation request may include an identifier, an encrypted server nonce, an initial vector and an OTP. An identifier may be understood, for the purposes of this application, as a symbol that names a language entity. An identifier may denote, inter alia, a variable, subroutine, package, type, or label. An encrypted server nonce may be understood, for the purposes of this application, as an encrypted 64-hex random number generated by the application, which may be associated with a server. The nonce is part of the one-time-activation process and ensures that no other computer can register with the same data. The number may be defined by an algorithm. The use of a nonce minimizes the risk of a hacker being able to decrypt the data, because the encrypted nonce is only used one time. An initial vector, also known as a starting variable, may be understood for the purposes of this application, as a fixed length of characters which is input into a cryptographic primitive. The input is typically random or pseudorandom. Randomization is important in encryption so that an intruder cannot deduce associations between sections of the encrypted communication.

The transmitter may be further configured to transmit a post-activation request to the provider. The receiver may be further configured to receive a successful activation message from the provider in response to the provider executing a number of components.

The components may include validating the nonce, validating the OTP, and deriving a token binary large object ("blob"). The components may also include determining the existence of other tokens associated with the user and deactivating any other tokens associated with the user. The components may also include flagging the OTP seed application as registered.

The receiver may also be further configured to receive an unsuccessful message if the activation was unsuccessful. The receiver may be further configured to receive information pertaining to the reason why the activation was unsuccessful.

The transmitter may also be configured to transmit token authentication information to the provider.

The OTP seed application may be configured to generate an OTP in response to a prompt for an OTP from the provider. The OTP may be based on an OTP seed generated by the OTP seed application, a point in time, and any other suitable information.

The transmitter may also be configured to transmit the OTP to the provider, preferably independent of user interaction, when prompted to by the provider.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the mobile device computer 101.

The memory 115 may be comprised of any suitable permanent storage technology—e.g., a hard drive. The memory 115 stores software including the operating system 117 any application(s) 119 along with any data 111 needed for the operation of the mobile device system 100. Alternatively, some or all of mobile device computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

Mobile device system 100 may be connected to other mobile device systems via a LAN interface 113.

Mobile device system 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server.

Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
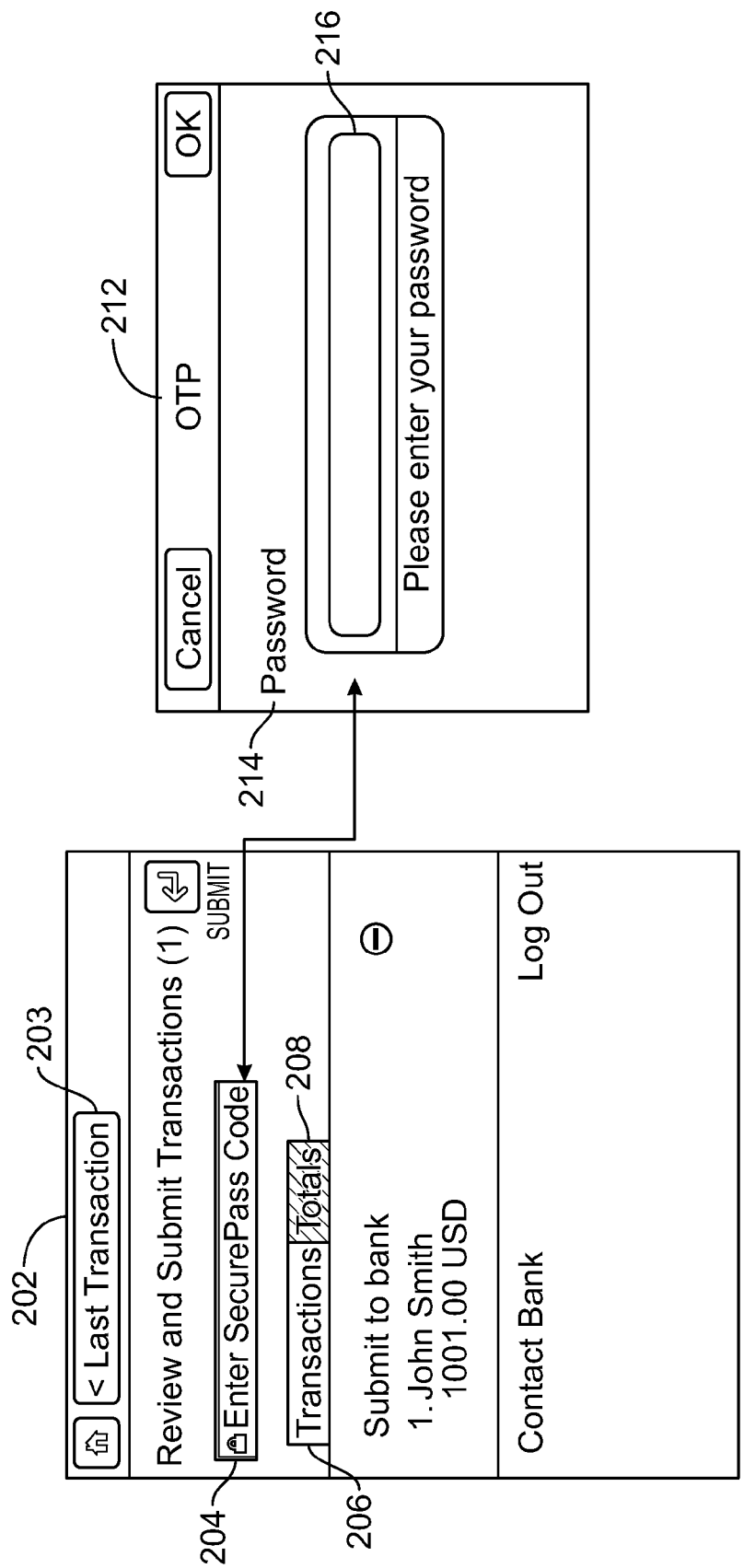
FIG. 2 shows an illustrative apparatus in accordance with principles of the invention.

FIG. 2 shows an illustrative graphical user interface ("GUI"). The illustrative GUI depicts a conventional OTP entry screen. This illustration shows a screen 202, which includes buttons 203, 204, 206, and 208. Button 203 allows a user to toggle between the presently displayed transaction and the last transaction. A user who wishes to click the current transactions button 206 or the totals button 208 is required to click on button 204 to enter the OTP. Clicking on button 204 may cause the computer program to open screen 212, in which a user may enter his password 214 into the text field 216.

Figure 3:
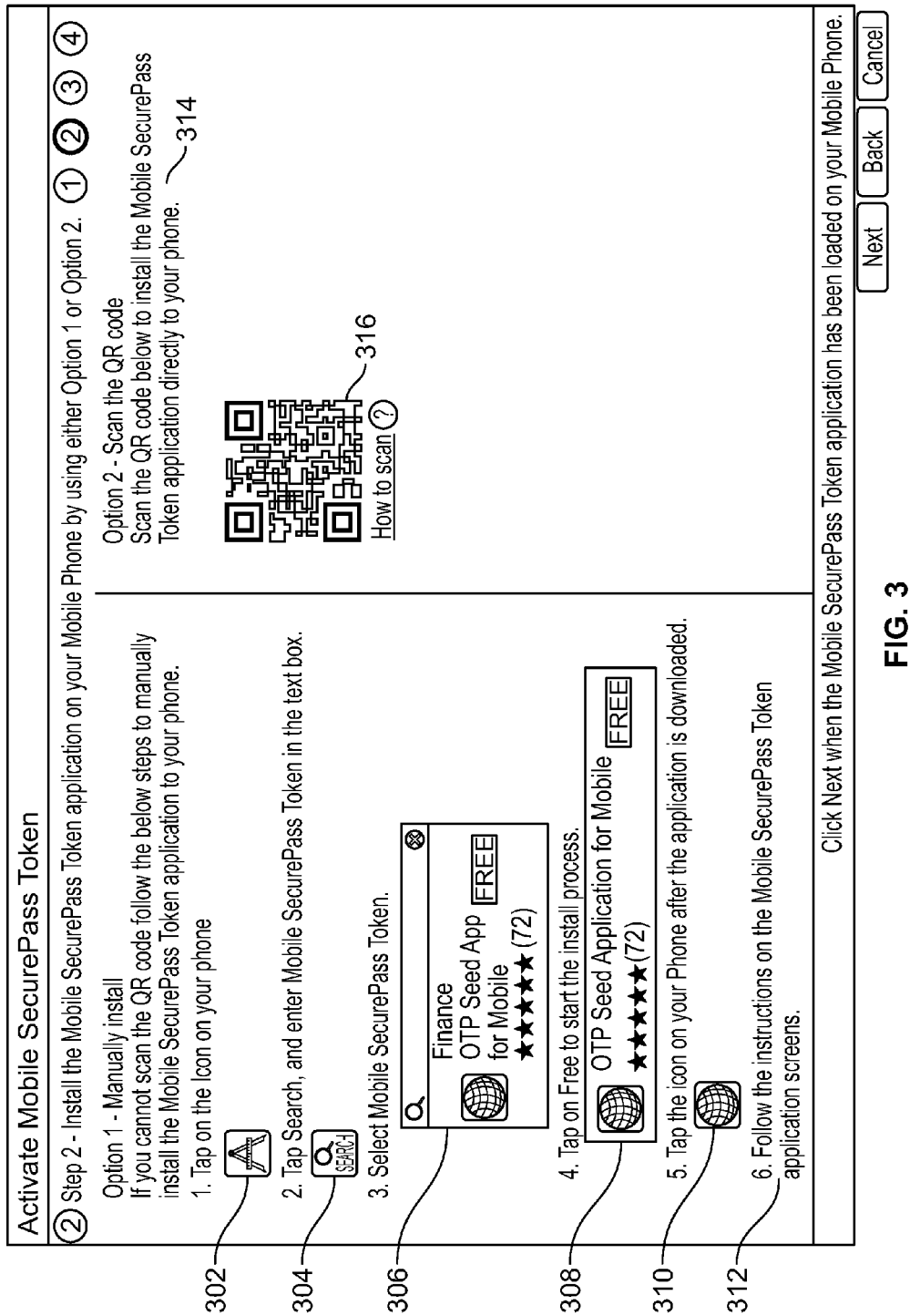
FIG. 3 shows an illustrative apparatus in accordance with principles of the invention.

FIG. 3 shows an illustrative GUI according to some embodiments. The illustrative GUI shows a screen in which a user may activate a mobile secure-pass token application. A user may have two or more options of how to download the mobile secure-pass token application. Option 1 describes how a user may download the application manually. Step 1 of option 1, instructs the user to tap the icon 302 on his mobile device. Step 2 of option 1, instructs the user to tap the search icon 304 and enter "mobile secure-pass token" in the text box. Step 3 of option 1, instructs the user to select 306, the mobile device secure-pass token. Step 4 of option 1, instructs the user to tap inside the text box 308 on the "Free" button to start the installation process. Step 5 of option 1, instructs the user to tap icon 310 on his mobile device after the application is downloaded. Step 6 of option 1, as shown in 312, instructs the user to follow the instructions shown on the mobile secure-pass token application screens. Option 2 describes how a user may download the application preferably minimizing user interaction. Text 314 instructs the user to scan the QR code 316 to install the mobile secure-pass token application directly on his phone.

Figure 4:
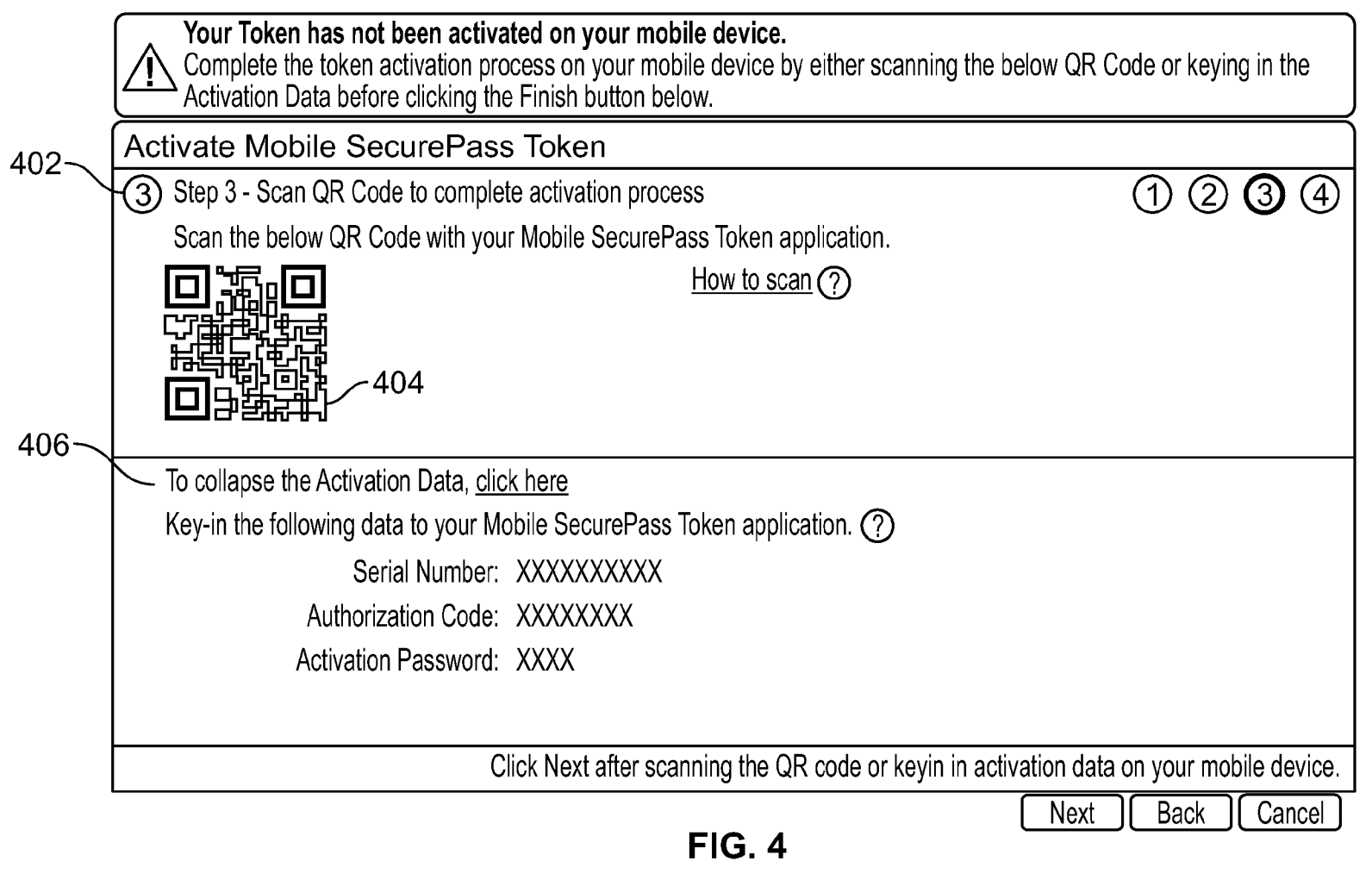

FIG. 4 shows an illustrative GUI. The illustrative GUI shows that the user the token has not been activated on his phone. FIG. 4 also instructs the user how to activate the mobile secure-pass token. The user may be presented with two or more options to complete the activation process. Step 3, at 402, instructs the user to scan the QR code 404 to complete the activation process. QR code 404 may contain the activation data, which may include the serial number, the authorization code, and the activation password, and any other suitable data. The user may also type in the activation data, as shown with text 406, to the mobile secure-pass token application. In certain embodiments, scanning the QR code 404 may provide filled in fields on a user device, such as fields including serial number, authorization code and/or activation password to appear on a user screen.

Figure 5:
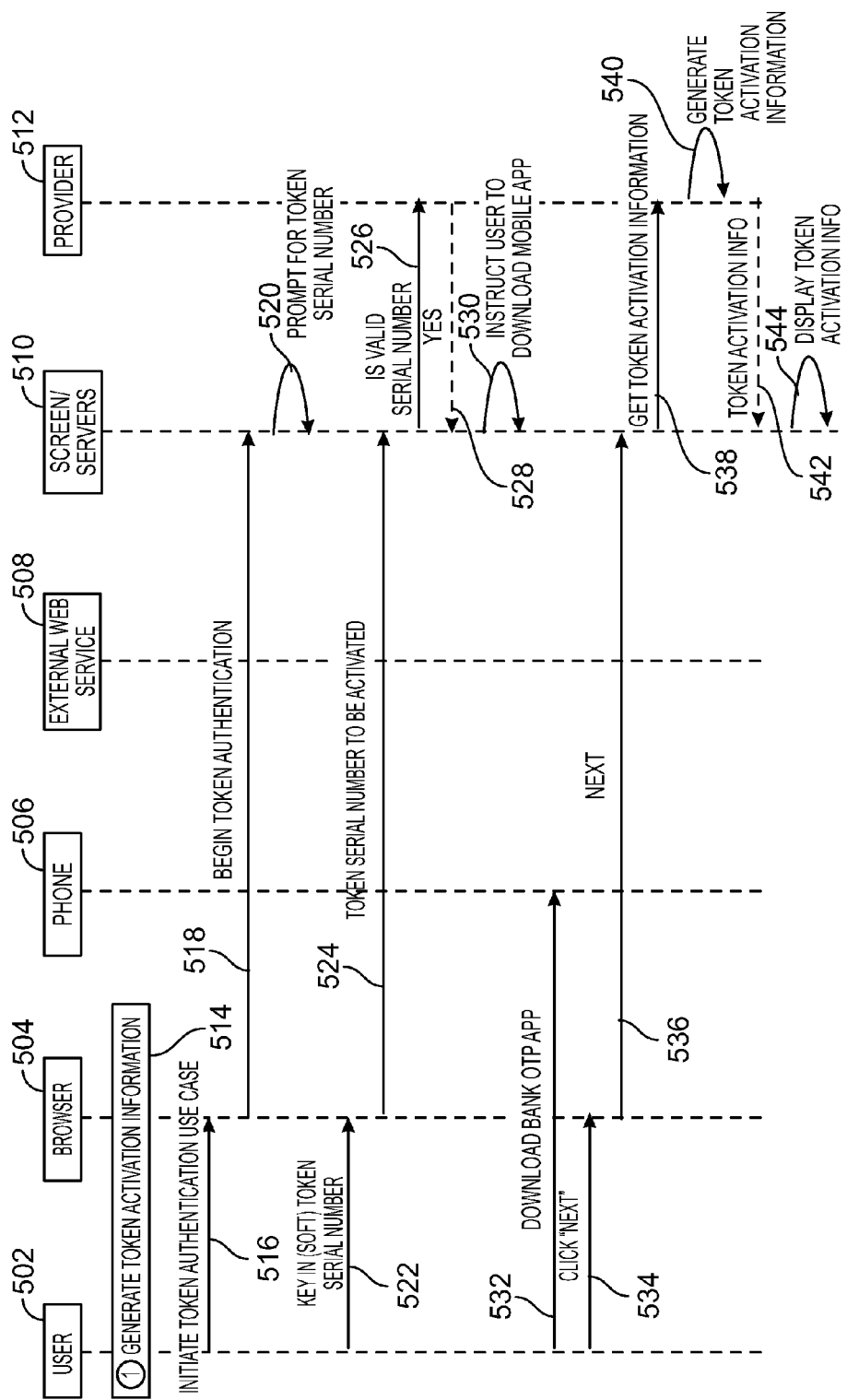
FIG. 5 shows illustrative elements of a process in accordance with the principles of the invention.

FIG. 5 shows an illustrative flow chart showing generating token activation information in the form of characters which the user may type into mobile device. Line number 502 represents the user. Line number 504 represents the browser. Line number 506 represents the phone. Line number 508 represents an external web service. Line number 510 represents the screen/servers. Line number 512 represents the provider. Text box 514 shows that the flow chart relates to generating token activation information. Step 516 shows the user may transmit initiation of the token authentication use case. Step 518 shows the browser may transmit the message to begin token authentication to the screen/servers. Step 520 shows the screen/servers may prompt for the token serial number. Step 522 shows the user may key in the token serial number into the browser. Step 524 shows the browser may transmit the token serial number to the screen/servers to be activated. Step 526 shows the screen/servers may query the provider if the serial number is valid. Step 528 shows the provider may transmit the positive response to the screen/servers. Step 530 shows the screen/servers may instruct the user to download the mobile application. Step 532 shows the user may request from the phone to download the bank OTP application. Step 534 shows the user may click the "next" button. The click may be transmitted to the browser. Step 536 shows the "next" response being transmitted from the browser to the screen/servers. Step 538 shows the screen/servers may request from the provider the token activation information. Step 540 shows the provider may generate the token activation information. Step 542 shows the token activation information may be transferred from the provider to the screen/servers. Step 544 shows the screen/servers displaying the token activation information.

Figure 6:
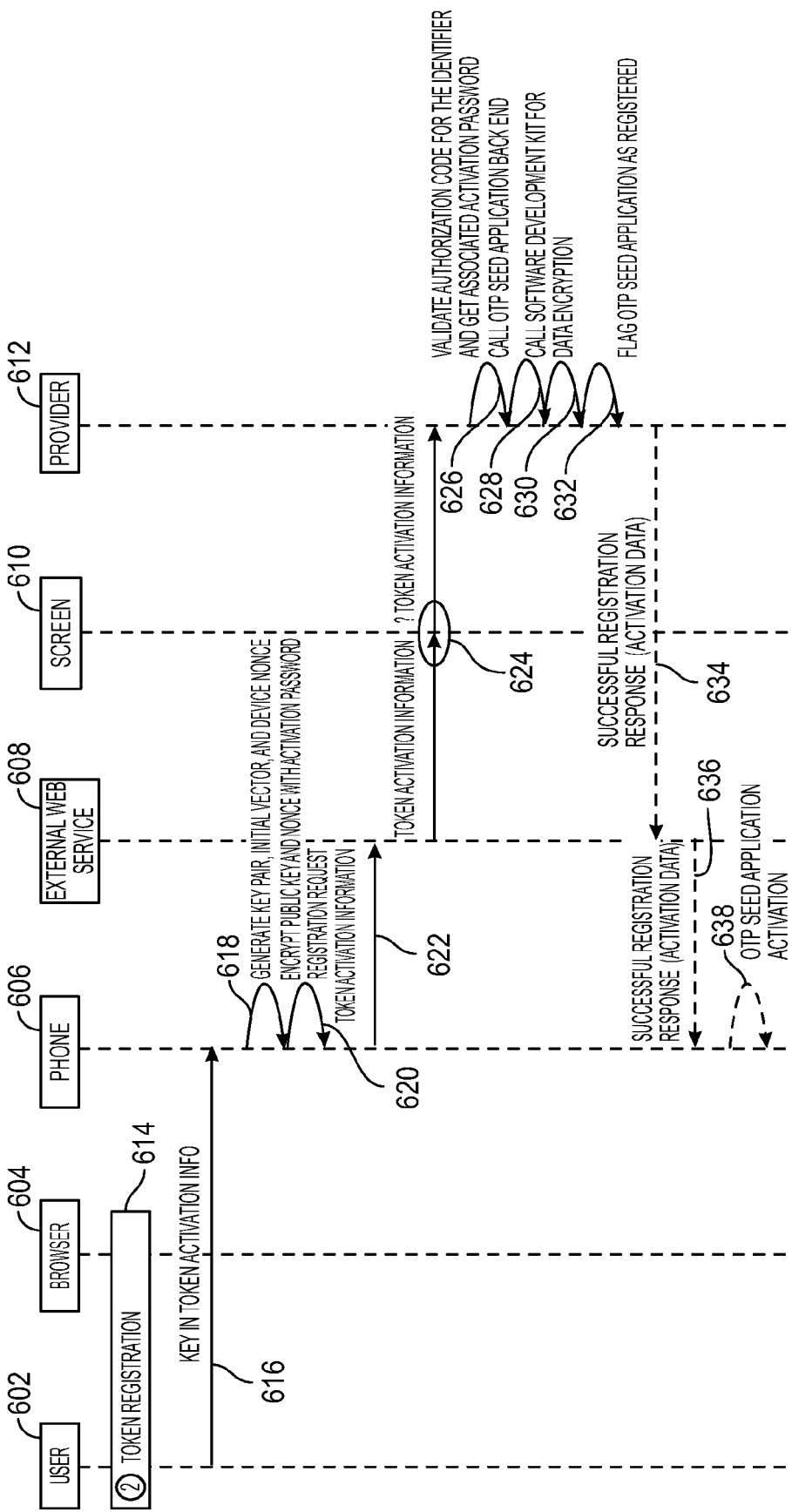
FIG. 6 shows illustrative elements of a process in accordance with the principles of the invention.

FIG. 6 shows an illustrative flow chart showing token registration. Line 602 represents the user. Line 604 represents the browser. Line 606 represents the phone. Line 608 represents the external web service. Line 610 represents the screen. Line 612 represents the provider. Text box 614 shows that the flow chart relates to token registration. Step 616 shows the user keys in token activation information into the phone. Step 618 shows the phone generates key pair, initial vector, and device nonce information. Step 620 shows the phone encrypts the public key and nonce with the activation password registration request. Step 622 shows the token activation information transmitted from the phone to the external web service. Step 624 shows the token activation information may be transmitted from the external web service to the screen and from the screen to the provider. Step 624 also shows the token activation information may be transmitted from the external web service directly to the provider. Step 626 shows the provider validates the authorization code for the identifier and gets the associated activation password. Step 628 shows the provider may call the OTP seed application back end. Step 630 shows the provider may call a software development kit for data encryption. Step 632 shows the provider may flag the OTP seed application as registered. Step 634 shows the provider may transfer the successful registration response, which may include the activation data, to the external web service. Step 636 shows the external web service may transmit the successful registration response, which may include the activation data, to the phone. Step 636 shows the phone may activate the OTP seed application.

Figure 7:
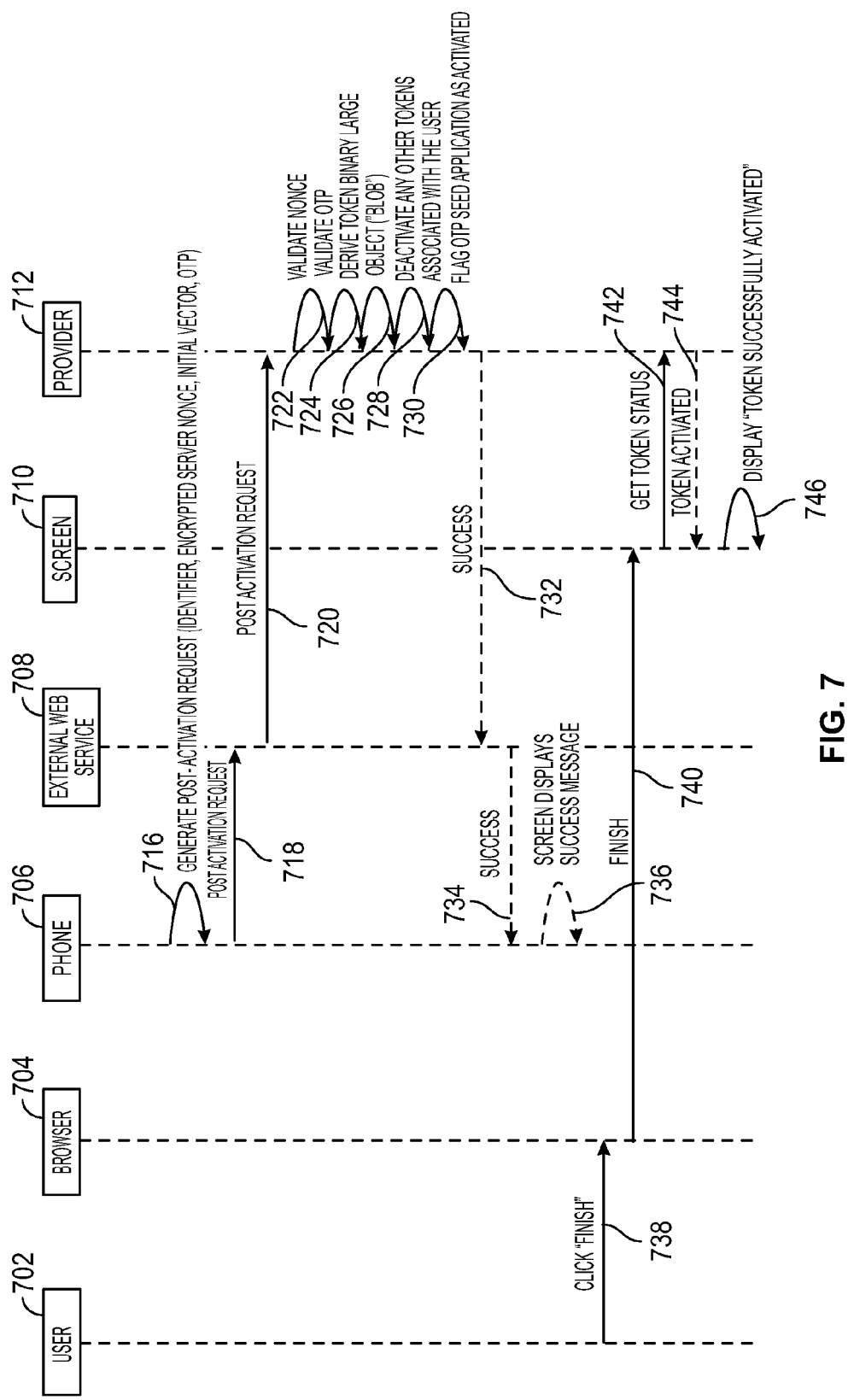
FIG. 7 shows illustrative elements of a process in accordance with the principles of the invention.

FIG. 7 shows an illustrative flow chart showing token activation. Line 702 represents the user. Line 704 represents the browser. Line 706 represents the phone. Line 708 represents the external web service. Line 710 represents the screen. Line 712 represents the provider. Step 716 shows the phone generate post-activation request, which may include the identifier, encrypted server nonce, initial vector, and OTP. Step 718 shows the phone transmitting the post-activation request to the external web service. Step 720 shows the external web service may transmit the post-activation request to the provider. Step 722 shows the provider may validate the nonce. Step 724 shows the provider may validate the OTP. Step 726 shows the provider may derive the token blob. Step 728 shows the provider may deactivate any other tokens associated with the user. Step 730 shows the provider may flag the OTP seed application as activated. Step 732 shows the provider may transmit the success message to the external web service. Step 734 shows the external web service may transmit the success message to the phone. Step 736 shows the phone screen may display the success message. Step 738 shows the user clicking finish, which is may be transmitted to the browser. Step 740 shows the browser may transmit the finish message to the screen. Step 742 shows the screen may request from the provider what the token status is. Step 744 shows the provider may transmit to the screen that the token has been activated. Step 746 shows the screen may display that the token has been successfully activated.

Figure 8:
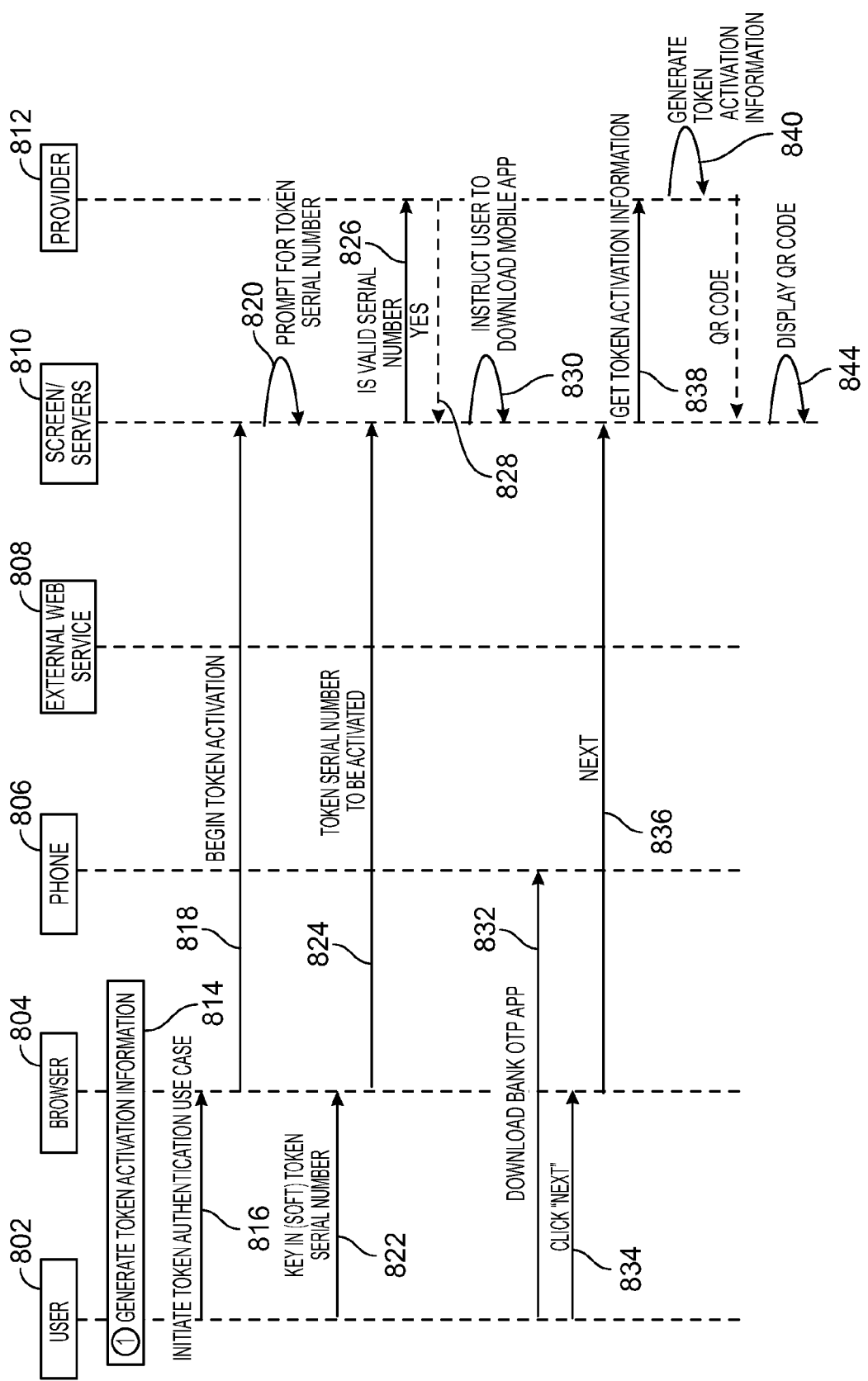
FIG. 8 shows illustrative elements of a process in accordance with the principles of the invention.

FIG. 8 shows an illustrative flow chart showing generating of token activation information in the form of QR code, which the user may scan in on his mobile device. Line number 802 represents the user. Line number 804 represents the browser. Line number 806 represents the phone. Line number 808 represents the external web service. Line number 810 represents the screen/servers. Line number 812 represents the provider. Text box 814 shows that the flow chart relates to generating token activation information. Step 816 shows the user may transmit initiation of the token authentication use case. Step 818 shows the browser may transmit the message to begin token authentication to the screen/servers. Step 820 shows the screen/servers may prompt for the token serial number. Step 822 shows the user may key in the token serial number into the browser. Step 824 shows the browser may transmit the token serial number to the screen/servers to be activated. Step 826 shows the screen/servers may query the provider if the serial number is valid. Step 828 shows the provider may transmit the positive response to the screen/servers. Step 830 shows the screen/servers may instruct the user to download the mobile application. Step 832 shows the user may request from the phone to download the bank OTP application. Step 834 shows the user clicking the next button, which may be transmitted to the browser. Step 836 shows the "next" response may be transmitted from the browser to the screen/servers. Step 838 shows the screen/servers may request from the provider the token activation information. Step 840 shows the provider may generate the token activation information. Step 842 shows the provider may transmit the QR code to the screen/servers. Step 844 shows the screen/servers may display the QR code.

Figure 9:
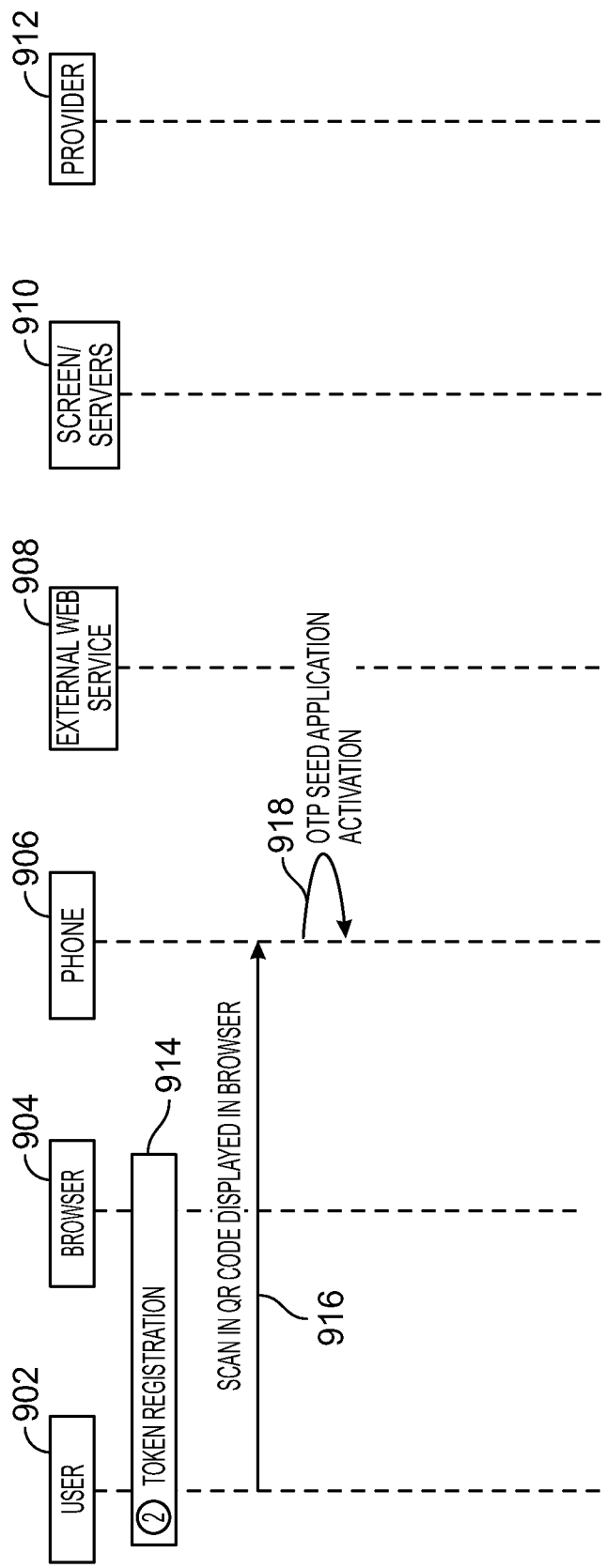
FIG. 9 shows illustrative elements of a process in accordance with the principles of the invention.

FIG. 9 shows an illustrative flow chart showing token registration. Line number 902 represents the user. Line number 904 represents the browser. Line number 906 represents the phone. Line number 908 represents the external web service. Line number 910 represents the screen/servers. Line number 912 represents the provider. Text box 914 shows that the flow chart relates to token registration. Step 916 shows the user may scan in the QR code displayed in his browser. Step 918 shows the phone may activate the OTP seed application.

Figure 10:
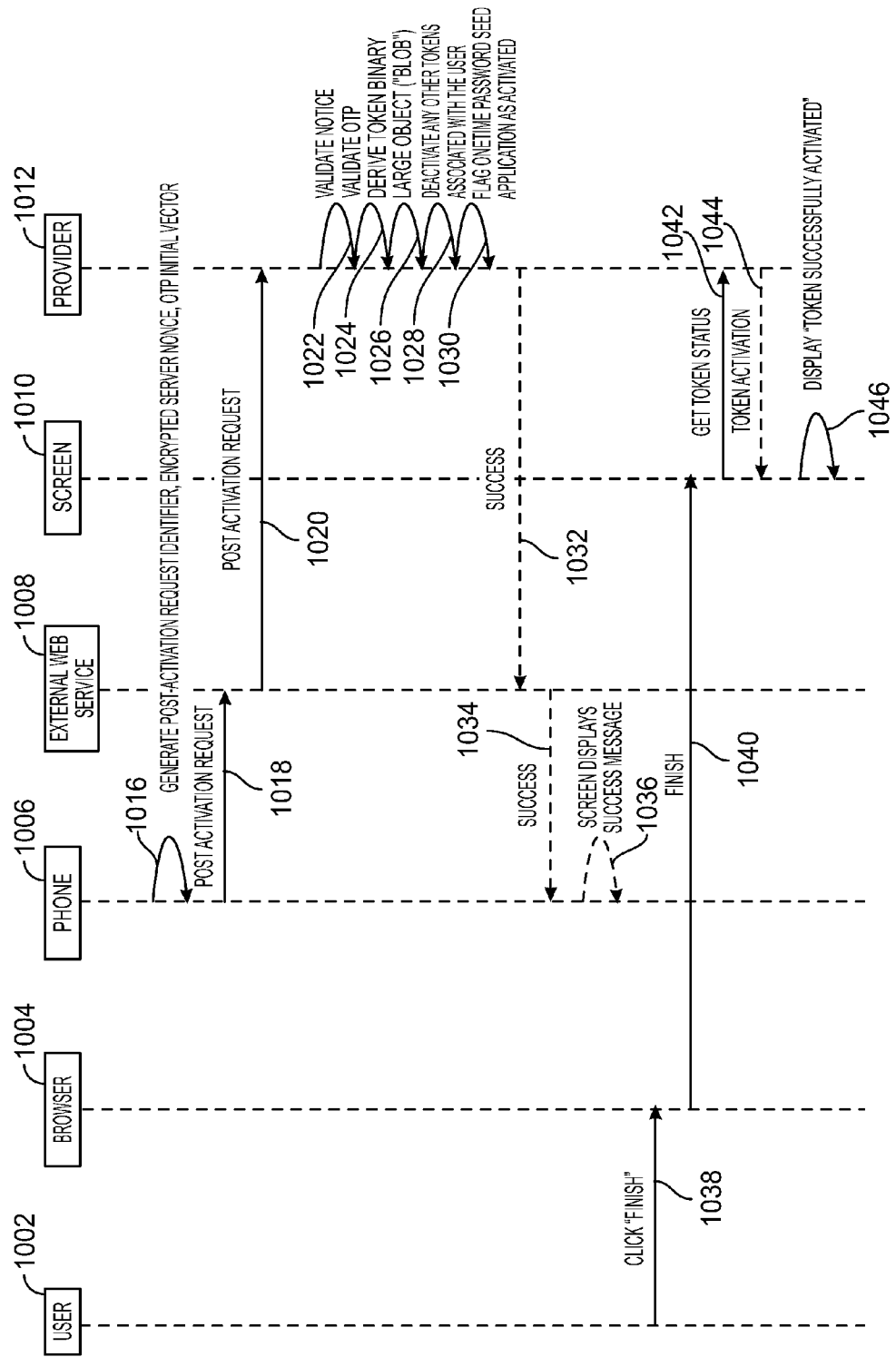
FIG. 10 shows illustrative elements of a process in accordance with the principles of the invention.

FIG. 10 shows an illustrative flow chart showing token activation. Line 1002 represents the user. Line 1004 represents the browser. Line 1006 represents the phone. Line 1008 represents the external web service. Line 1010 represents the screen. Line 1012 represents the provider. Step 1016 shows the phone may generate a post-activation request, which may include an identifier, encrypted server nonce, initial vector, and OTP. Step 1018 shows the phone may transmit the post-activation request to the external web service. Step 1020 shows the external web service may transmit the post-activation request to the provider. Step 1022 shows the provider may validate the nonce. Step 1024 shows the provider may validate the OTP. Step 1026 shows the provider may derive the token blob. Step 1028 shows the provider may deactivate any other tokens associated with the user. Step 1030 shows the provider may flag the OTP seed application as activated. Step 1032 shows the provider may transmit the success message to the external web service. Step 1034 shows the external web service may transmit the success message to the phone. Step 1036 shows the phone screen may display the success message. Step 1038 shows the user clicking finish, which may be transmitted to the browser. Step 1040 shows the browser may transmit the finish message to the screen. Step 1042 shows the screen may request from the provider what the token status is. Step 1044 shows the provider may transmit to the screen that the token has been activated. Step 1046 shows the screen may display that the token has been successfully activated.

Figure 11:
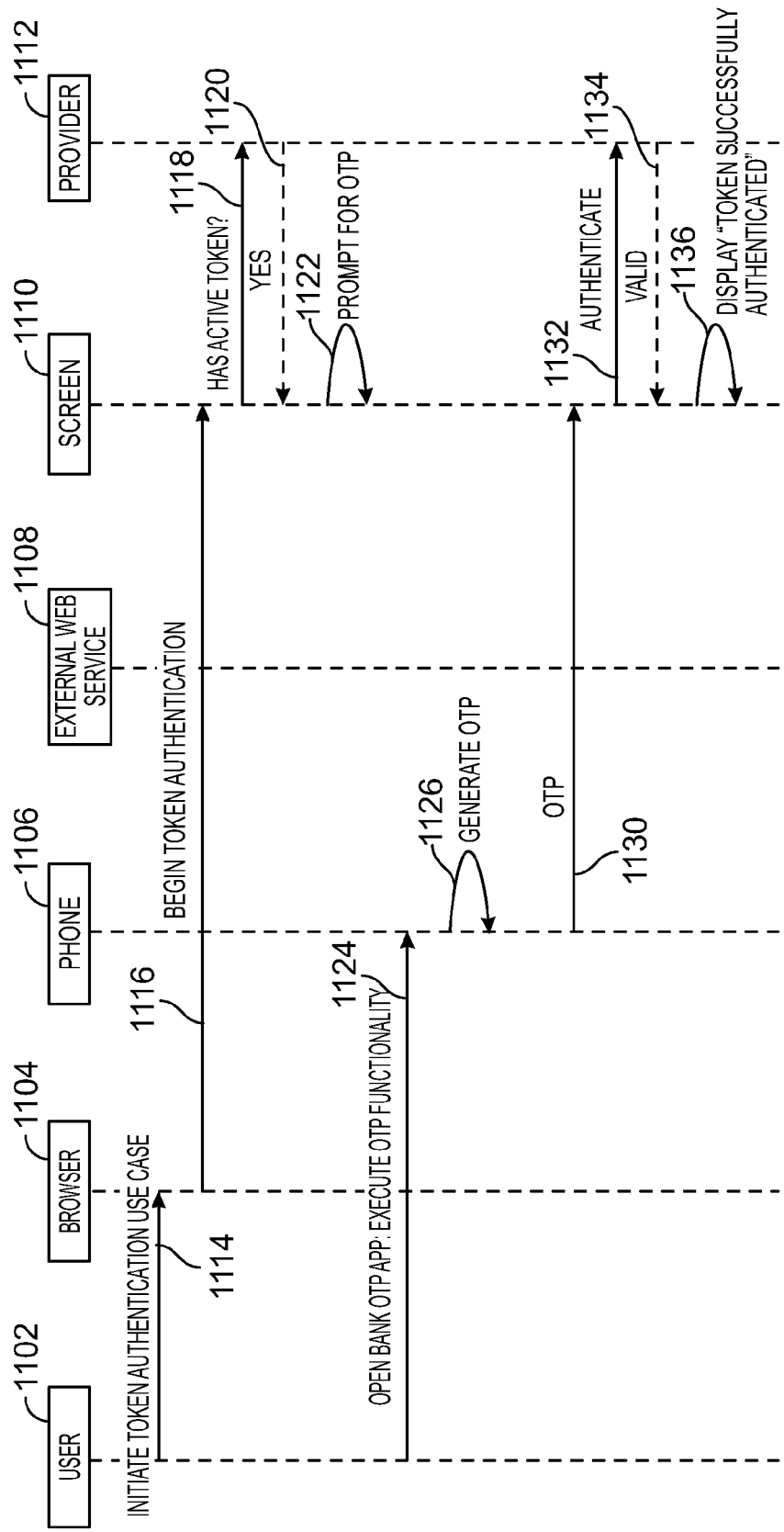
FIG. 11 shows illustrative elements of a process in accordance with the principles of the invention.

FIG. 11 shows an illustrative flow chart showing the token authentication use case. Line 1102 represents a user. Line 1104 represents a browser. Line 1106 represents a phone. Line 1108 represents an external web service. Line 1110 represents a screen. Line 1112 represents a provider. Step 1114 shows the user may initiate the token authentication use case. Step 1116 shows a browser may begin token authentication, which may be transmitted to the screen. Step 1118 shows the screen may query the provider to determine if the user has an active token. Step 1120 shows the provider may transmit to the screen that yes, the user has an active token. Step 1122 shows the screen may prompt for an OTP. Step 1124 shows the user may open a bank OTP seed application and execute OTP functionality, which may be transmitted to the phone. Step 1126 shows the phone may generate an OTP. Step 1130 shows the OTP may be transmitted from the phone to the screen. Step 1132 shows the screen may request the provider to authenticate the OTP. Step 1134 shows the provider may transmit that OTP is valid. Step 1136 shows the screen may display the "token successfully authenticated" message.

Thus, methods and apparatus for integrating a dynamic token generator into a mobile device have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. Apparatus for integrating a dynamic token generator into a mobile device comprising:
   a display;
   a transmitter configured to transmit a serial number to a provider for validation, said validation configured to transform the serial number to a validated token serial number;
   a receiver configured to receive a quick response ("QR") code which contains token activation information relating to the validated token serial number, said token activation information comprising the validated token serial number, an activation code and an activation password;
   a processor which is configured to internally recognize and scan in the quick response code displayed on the display;
   the processor is further configured to activate a onetime password ("OTP") seed application using at least some of the information stored in the quick response code;
   the processor is further configured to generate a post-activation request in response to the activation of the OTP seed application, said post-activation request comprising:
   an identifier;
   an encrypted server nonce;
   an initial vector; and
   an OTP
   the transmitter is further configured to transmit the post-activation request to the provider;
   the receiver is further configured to receive a successful activation message from the provider, in response to the provider:
   validating the nonce;
   validating the OTP;
   deriving a token blob;
   determining the existence of other passwords associated with the user and deactivating any other token associated with the user; and
   flagging the OTP seed application as activated.

2. The apparatus of claim 1, wherein the transmitter is further configured to transmit token authentication information to the provider.

3. The apparatus of claim 2, wherein:
   the OTP seed application is configured to generate a second OTP in response to a prompt for an OTP from the provider, the second OTP being based on, at least in part, an OTP seed, generated by the OTP seed application, and a point in time;
   the transmitter further configured to transmit the second OTP to the provider, independent of user interaction, when prompted to by the provider.

4. One or more non-transitory computer-readable media storing computer-executable instructions which, when executed by a processor on a computer system, perform a method for integrating a dynamic token generator into a mobile device comprising:
   displaying a display;
   transmitting a serial number to a provider for validation, said validation configured to transform the serial number to a validated token serial number;
   receiving a quick response ("QR") code which contains token activation information relating to the validated token serial number, said token activation information comprising the validated token serial number, an activation code, and an activation password;
   internally recognizing and scanning in the quick response code displayed in the display;
   activating an OTP seed application using at least some of the information stored in the quick response code;
   generating a post-activation request in response to the activation of the OTP seed application, said post-activation request comprising:
   an identifier;
   an encrypted server nonce;
   an initial vector; and
   an OTP;
   transmitting the post-activation request to the provider;
   receiving a successful activation message from the provider in response to the provider:
   validating the nonce;
   validating the OTP;
   deriving a token blob;
   determining the existence of other passwords associated with the user and deactivating any other tokens associated with the user;
   flagging the OTP seed application as activated.

5. The method of claim 4, further comprising transmitting token authentication information to the provider.

6. The method of claim 5, further comprising:
   generating a second OTP in response to a prompt for an OTP received from the provider, the second OTP being based, at least in part, on an OTP seed, generated by the OTP seed application, and a point in time;
   transmitting the second OTP to the provider, independent of user interaction, when prompted to by the provider.

* * * * *